US012318807B2

(12) United States Patent
Uezono et al.

(10) Patent No.: US 12,318,807 B2
(45) **Date of Patent: *Jun. 3, 2025**

(54) METHOD OF PRODUCING ELECTRODE AND ELECTRODE PRODUCTION APPARATUS

(71) Applicant: TOYOTA JIDOSHA KABUSHIKI KAISHA, Toyota (JP)

(72) Inventors: Tomoyuki Uezono, Okazaki (JP); Momoka Oda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,423

(22) Filed: Mar. 8, 2024

(65) Prior Publication Data

US 2024/0246113 A1 Jul. 25, 2024

Related U.S. Application Data

(60) Continuation of application No. 18/446,734, filed on Aug. 9, 2023, which is a division of application No.
(Continued)

(30) Foreign Application Priority Data

Oct. 28, 2021 (JP) ................................. 2021-176370

(51) Int. Cl.
*H01M 4/04* (2006.01)
*B05B 5/04* (2006.01)
(Continued)

(52) U.S. Cl.
CPC .............. *B05D 1/04* (2013.01); *B05B 5/0418* (2013.01); *H01M 4/0404* (2013.01);
(Continued)

(58) Field of Classification Search
CPC .... B05B 5/0418; B05B 1/044; H01M 4/0404; H01M 4/0419; B05D 1/04; B05D 3/0254; B05D 3/312
(Continued)

(56) References Cited

U.S. PATENT DOCUMENTS 5,110,618 A 5/1992 Faust
7,361,207 B1 4/2008 Coffey et al.
(Continued)

FOREIGN PATENT DOCUMENTS

CN 105336913 A 2/2016
JP 2018192380 A 12/2018
(Continued)

OTHER PUBLICATIONS

Tomoyuki Uezono et al., U.S. Appl. No. 18/048,088, Restriction Requirement issued May 19, 2023.
(Continued)

*Primary Examiner* — Brian K Talbot
(74) *Attorney, Agent, or Firm* — Dickinson Wright, PLLC

(57) ABSTRACT

(a) An aerosol including an active material, a binder, and a gas is made. (b) A film-like flow of the aerosol is formed. (c) An electrically-charged region is formed by corona discharge. (d) The film-like flow passes through the electrically-charged region. (e) The film-like flow is introduced into an electric field after passing through the electrically-charged region. In the electric field, an active material layer is formed by adhering a solid component of the film-like flow onto a surface of a substrate by electrostatic force.

5 Claims, 6 Drawing Sheets

Related U.S. Application Data

18/048,088, filed on Oct. 20, 2022, now Pat. No. 12,103,037.

(51) Int. Cl.

| | |
|---|---|
| ***B05D 1/04*** | (2006.01) |
| *B05B 1/04* | (2006.01) |
| *B05D 3/02* | (2006.01) |
| *B05D 3/12* | (2006.01) |

(52) U.S. Cl.

CPC ........... *H01M 4/0419* (2013.01); *B05B 1/044* (2013.01); *B05D 3/0254* (2013.01); *B05D 3/12* (2013.01)

(58) Field of Classification Search

USPC .................................................. 427/458, 115

See application file for complete search history.

(56) References Cited

U.S. PATENT DOCUMENTS

| | | | | |
|---|---|---|---|---|
| 8,062,697 | B2 | 11/2011 | Yaniv et al. | |
| 12,103,037 | B2 * | 10/2024 | Uezono | H01M 4/0419 |
| 2002/0085977 | A1 * | 7/2002 | Fotland | B05B 5/087 424/45 |
| 2005/0123777 | A1 * | 6/2005 | Maijala | B05B 5/14 427/458 |
| 2006/0093737 | A1 | 5/2006 | Dick et al. | |
| 2017/0098818 | A1 * | 4/2017 | Cheng | H01M 4/662 |
| 2017/0331100 | A1 * | 11/2017 | Phares | H01M 4/0435 |
| 2019/0001360 | A1 | 1/2019 | Lefebvre et al. | |
| 2019/0252668 | A1 * | 8/2019 | Phares | H01M 4/139 |

FOREIGN PATENT DOCUMENTS

| | | | |
|---|---|---|---|
| JP | 2021082396 | A | 5/2021 |
| WO | 2017/054297 | A1 | 4/2017 |

OTHER PUBLICATIONS

Tomoyuki Uezono et al., U.S. Appl. No. 18/048,088, Non-Final Office Action issued Sep. 6, 2023.

Tomoyuki Uezono et al., U.S. Appl. No. 18/048,088, Final Office Action issued Feb. 2, 2024.

* cited by examiner

METHOD OF PRODUCING ELECTRODE AND ELECTRODE PRODUCTION APPARATUS

This application is a continuation of U.S. patent application Ser. No. 18/446,734, filed Aug. 9, 2023, which is a division of U.S. patent application Ser. No. 18/048,088, filed Oct. 20, 2022, which is based on Japanese Patent Application No. 2021-176370 filed on Oct. 28, 2021, with the Japan Patent Office, the entire contents of which are hereby incorporated by reference.

BACKGROUND

Field

The present disclosure relates to a method of producing an electrode, and to an electrode production apparatus.

Description of the Background Art

Japanese Patent Laying-Open No. 2018-192380 discloses an electrostatic powder coating device.

SUMMARY

Generally, an electrode is produced by forming an active material layer on a surface of a substrate. A method of forming an active material layer by electrostatic coating has been proposed. Into air, powder (an electrode material) is sprayed, for example. Corona discharge that occurs from a needle-shaped corona discharge electrode makes the powder be electrically charged. An electric field is formed to generate electrostatic force in a direction toward the substrate. Due to the electrostatic force, the powder is adhered onto the surface of the substrate, with the result that the active material layer can be formed.

However, a distance between the powder flying in air and the needle-shaped corona discharge electrode tends to be likely to be varied. When the distance between the powder (target to be charged) and the corona discharge electrode is varied, an amount of charges of the powder is also varied. The electrostatic force in the electric field is proportional to the amount of charges. Since the variation in the amount of charges is large, coating efficiency may be decreased.

It is an object of the present disclosure to reduce a variation in amount of charges.

Hereinafter, the technical configuration and effects of the present disclosure will be described. It should be noted that the action mechanism according to the present specification includes presumption. The action mechanism does not limit the technical scope of the present disclosure.

1. A method of producing an electrode includes the following (a) to (e).

(a) An aerosol including an active material, a binder and a gas is made.

(b) A film-like flow of the aerosol is formed.

(c) An electrically-charged region is formed by corona discharge.

(d) The film-like flow is allowed to pass through an electrically-charged region.

(e) The film-like flow is introduced into an electric field after passing through the electrically-charged region.

In the electric field, an active material layer is formed by adhering a solid component of the film-like flow onto a surface of a substrate by electrostatic force.

In the present disclosure, the film-like flow of the aerosol is formed. The film-like flow expands in the form of a film and flies. Since the charging target is planar, a variation in distance between the charging target and the corona discharge electrode is expected to be reduced, for example. That is, it is expected to reduce a variation in amount of charges.

2. The film-like flow has a flow direction and a width direction. The width direction is orthogonal to the flow direction. The electrically-charged region may be formed to pass through the film-like flow in the width direction.

The film-like flow has the flow direction, the width direction, and a thickness direction. The flow direction is a flight direction (traveling direction) of the aerosol. The width direction is orthogonal to the flow direction. The thickness direction is orthogonal to the flow direction and the width direction.

The electrically-charged region is formed by corona discharge. The electrically-charged region is formed to pass through the film-like flow in the width direction. Therefore, the film-like flow (aerosol) is expected to be uniformly charged in the width direction. That is, it is expected to reduce the variation in amount of charges in the width direction.

3. The corona discharge may occur from a corona discharge electrode. The corona discharge electrode may extend in a form of a line along the width direction.

For example, since the corona discharge electrode extends in the form of a line along the width direction, the electrically-charged region passing through the film-like flow may be formed.

4. In the width direction, the corona discharge electrode may have a width larger than a width of the film-like flow.

Since the corona discharge electrode has a width larger than that of the film-like flow, the electrically-charged region passing through the film-like flow may be formed.

5. The corona discharge electrode may include a plurality of protrusions. The plurality of protrusions are arranged side by side in the width direction.

Corona discharge is likely to occur at the tip of each protrusion. By arranging the plurality of protrusions side by side in the width direction, a charge density in the electrically-charged region is expected to become uniform. Thus, it is expected to reduce the variation in amount of charges.

6. In the (d), a gas may be blown toward the film-like flow in a direction in which the film-like flow is separated away from the corona discharge electrode.

When the film-like flow (aerosol) flies and is dispersed to the corona discharge electrode side, a material may be lost, with the result that coating efficiency may be decreased. By blowing the gas to separate the film-like flow away from the corona discharge electrode, it is expected to improve the coating efficiency. It should be noted that the coating efficiency represents a ratio of an amount (mass) of formation of the active material layer with respect to an amount (mass) of introduction of the material.

7. The method of producing the electrode may further include, for example, the following (f).

(f) At least one of heat and pressure is applied to the active material layer to fix the active material layer to the substrate.

8. The substrate may be, for example, in a sheet form. The flow direction and width direction of the film-like flow may be along the surface of the substrate.

Since the film-like flow flies along the surface of the substrate, the active material layer is expected to be formed smoothly.

9. An electrode production apparatus includes: a support part; an electric-field-forming apparatus; an aerosol-supplying part; and a charging apparatus. The support part is to support the substrate. The electric-field-forming apparatus is to form an electric field. The aerosol-supplying part is to form a film-like flow of an aerosol. The charging apparatus is to form an electrically-charged region by corona discharge. The film-like flow is introduced into the electric field after passing through the electrically-charged region. The aerosol includes an active material, a binder and a gas. In the electric field, an active material layer is formed by adhering a solid component of the film-like flow to the substrate by electrostatic force.

In the production apparatus of "9", the production method of "1" can be performed.

10. The film-like flow has a flow direction and a width direction. The width direction is orthogonal to the flow direction. The electrically-charged region may be formed to pass through the film-like flow in the width direction.

In the production apparatus of "10", the production method of "2" can be performed.

11. The charging apparatus may include a corona discharge electrode. The corona discharge electrode may extend in a form of a line along the width direction.

In the production apparatus of "11", the production method of "3" can be performed.

12. The corona discharge electrode may include a plurality of protrusions. The plurality of protrusions are arranged side by side in the width direction.

In the production apparatus of "12", the production method of "5" can be performed.

13. The aerosol-supplying part may include, for example, a flat nozzle. The flat nozzle has an ejection port expanding in the width direction. The film-like flow of the aerosol can be ejected from the ejection port.

For example, the flat nozzle is suitable for formation of the film-like flow.

14. In the width direction, the corona discharge electrode may have a width larger than a width of the ejection port.

In the production apparatus of "14", the production method of "4" can be performed.

15. The electrode production apparatus may further include a blower apparatus. The blower apparatus may be to blow a gas toward the film-like flow in a direction in which the film-like flow is separated away from the corona discharge electrode.

In the production apparatus of "15", the production method of "6" can be performed.

16. The electrode production apparatus may further include a fixing apparatus. The fixing apparatus may be to apply at least one of heat and pressure to the active material layer to fix the active material layer to the substrate.

In the production apparatus of "16", the production method of "7" can be performed.

17. The support part may be in a roll form. The substrate may be in a sheet form. By rotation of the support part, the substrate may be transferred.

Since the support part is in the roll form, a roll-to-roll process can be applied. With the roll-to-roll process, productivity is expected to be improved.

18. In a cross section orthogonal to the rotation axis of the support part, the flow direction of the film-like flow may be along a tangential direction of the support part.

Since the film-like flow (aerosol) flies along the tangential direction of the roll, the active material layer is expected to be formed smoothly, for example.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
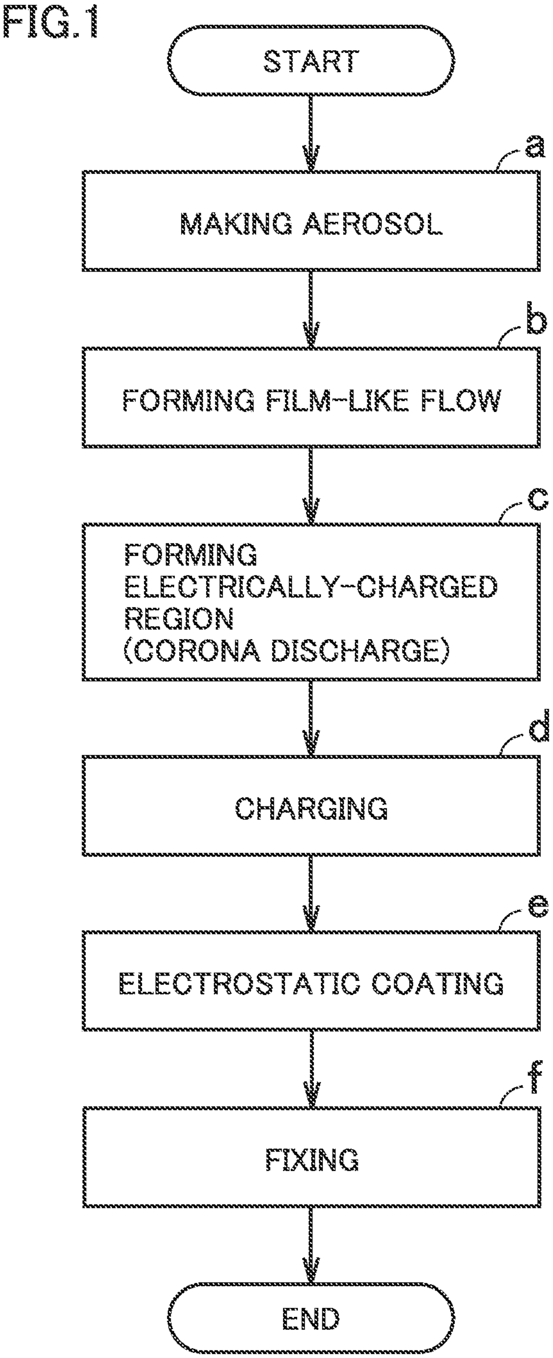
FIG. 1 is a schematic flowchart illustrating a method of producing an electrode according to the present embodiment.

Definitions of Terms, Etc.

Next, an embodiment of the present disclosure (which may also be simply called "the present embodiment") and an example of the present disclosure (which may also be simply called "the present example") will be described. It should be noted that neither the present embodiment nor the present example limits the technical scope of the present disclosure.

Herein, expressions such as "comprise", "include", and "have", and other similar expressions (such as "be composed of", for example) are open-ended expressions. In an open-ended expression, in addition to an essential component, an additional component may or may not be further included. The expression "consist of" is a closed-end expression. However, even when a closed-end expression is used, impurities present under ordinary circumstances as well as an additional element irrelevant to the technique according to the present disclosure are not excluded. The expression "consist essentially of" is a semiclosed-end expression. A semiclosed-end expression tolerates addition of an element that does not substantially affect the fundamental, novel features of the technique according to the present disclosure.

Herein, expressions such as "may" and "can" are not intended to mean "must" (obligation) but rather mean "there is a possibility" (tolerance).

Herein, a singular form also includes its plural meaning, unless otherwise specified. For example, "a particle" may mean not only "one particle" but also "a collection of particles (powdery body, powder, particle group)".

In the present specification, the order for implementing a plurality of steps, operations, processes, and the like included in each of various types of methods is not limited to the described order, unless otherwise specified. For example, a plurality of steps may proceed simultaneously. For example, a plurality of steps may be implemented in reverse order.

Herein, a numerical range such as "from m to n %" includes both the upper limit and the lower limit, unless otherwise specified. That is, "from m to n %" means a numerical range of "more than or equal to m % and less than or equal to n %".

Further, "more than or equal to m % and less than or equal to n %" includes "more than m % and less than n %". Moreover, any numerical value selected from a certain numerical range may be used as a new upper limit or a new lower limit. For example, any numerical value from a certain numerical range may be combined with any numerical value described in another location of the present specification or in a table or a drawing, for example, to create a new numerical range.

Herein, all the numerical values are regarded as being modified by the term "about". The term "about" may mean±5%, ±3%, ±1%, and/or the like, for example. Each numerical value can be an approximate value that can vary depending on the implementation configuration of the technique according to the present disclosure. Each numerical value can be expressed in significant figures. A measurement value can be an average value in multiple measurements. The number of measurements may be more than or equal to 3, more than or equal to 5, or more than or equal to 10. In general, as the number of measurements is larger, the reliability of the average value is expected to be improved. The measurement value can be rounded off based on the number of digits of the significant figure. The measurement value can include an error resulting from a detection limit of a measurement apparatus or the like, for example.

Herein, when a compound is represented by a stoichiometric composition formula such as "$LiCoO_2$", for example, this stoichiometric composition formula is merely a typical example. Alternatively, the composition ratio may be non-stoichiometric. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified. Further, doping with a trace element and/or substitution is also tolerated.

"Aerosol" herein refers to a dispersion system in which at least one of solid and liquid is dispersed in gas. Aerosol may also be called "fume", for example. The appearance of aerosol may be described as cloud-like or smoke-like, for example. Aerosol can be also referred to as "cloud powder".

"Electrically-charged region" herein refers to a region (space) in which a charge density is increased by corona discharge. The charge density can be measured by a suction-type Faraday cage.

"D50" herein is defined as a particle size in volume-based particle size distribution at which cumulative frequency of particle sizes accumulated from a small particle size side reaches 50%.

"Melting point" herein refers to the peak-top temperature for a melting peak (an endothermic peak) of a DSC (Differential Scanning Calorimetry) curve. The DSC curve may be measured in accordance with "JIS K 7121". "Near a melting point" may refer to the range of ±20° C. from the melting point, for example.

Any geometric term herein (such as "parallel", "vertical", and "perpendicular", for example) should not be interpreted solely in its exact meaning. For example, "parallel" may mean a geometric state that is deviated, to some extent, from exact "parallel". Any geometric term herein may include tolerances and/or errors in terms of design, operation, production, and/or the like. The dimensional relationship in each figure may not necessarily coincide with the actual dimensional relationship. The dimensional relationship (in length, width, thickness, and the like) in each figure may have been changed for the purpose of assisting the understanding of the technique according to the present disclosure. Further, a part of a configuration may have been omitted.

Herein, the expression "a is along a β direction" means that an angle (acute angle) formed between a direction that a has (for example, a direction in which an electrode extends) and the β direction is 0 to 45°. The formed angle may be 0 to 30° or 0 to 15°, for example. A formed angle of 0° indicates that the direction that a has is parallel to the β direction.

"Electrode" herein is used as a generic term for a positive electrode and a negative electrode. The electrode may represent the positive electrode or the negative electrode, or may represent both the positive electrode and the negative electrode.

<Method of Producing Electrode>

FIG. 1 is a schematic flowchart illustrating a method of producing an electrode according to the present embodiment. Hereinafter, the "method of producing an electrode according to the present embodiment" may be simply called "the present production method". The present production method includes "(a) making an aerosol", "(b) forming a film-like flow", "(c) forming an electrically-charged region", "(d) charging" and "(e) electrostatic coating". The present production method may further include, for example, "(f) fixing" or the like. It should be noted that an order of descriptions in the flowchart of FIG. 1 is just for the sake of convenience. For example, "(b) forming a film-like flow" to "(d) charging" may be performed substantially simultaneously.

In the present production method, an electrode for a lithium-ion battery may be produced, for example. However, a lithium-ion battery is merely an example. The present production method may be applied to any battery system. In the present production method, a positive electrode may be produced or a negative electrode may be produced.

<<(a) Making Aerosol>>

The present production method includes making an aerosol including an active material, a binder and a gas. The aerosol can be made by mixing the active material, the binder, and the gas, for example.

<Active Material>

The active material may include active material particles. The active material may be a collection of active material particles. That is, the active material may be in powder form. Each active material particle may be an aggregate of primary particles (namely, may be a secondary particle). In the aerosol, individual active material particles (secondary particles) may not be aggregated any more but they may be rather dispersed and floating. In the aerosol, substantially all the active material particles (secondary particles) may not be aggregated any more but they may be rather dispersed and floating. In the aerosol, some of the active material particles may be aggregated.

The active material may also include a very small amount of a metal foreign object. For example, during production of the active material, the production apparatus may wear, causing a metal foreign object to enter into the active material powder. The metal foreign object may include stainless steel (SUS), iron (Fe), copper (Cu), and/or the like, for example.

A large metal foreign object may adversely affect battery performance. As the size of the metal foreign object is larger, the mass of the metal foreign object can be also larger. In the present production method, the aerosol flies. During the flight of the aerosol, the metal foreign object, which has a large mass, cannot fly, so that the metal foreign object is expected to be removed from the aerosol.

The active material may have a D50 from 1 to 30 μm, or may have a D50 from 1 to 20 μm, or may have a D50 from 1 to 10 μm, for example.

The active material particle causes electrode reaction. The active material particle may include an optional component. The active material particle may include a positive electrode active material, for example. For example, the active material particle includes at least one selected from a group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. "(NiCoMn)" in "$Li(NiCoMn)O_2$", for example, means that the constituents within the parentheses are collectively regarded as a single unit in the entire composition ratio. As long as (NiCoMn) is collectively regarded as a single unit in the entire composition ratio, the amounts of individual constituents are not particularly limited. $Li(NiCoMn)O_2$ may include, for example, $Li(Ni_{1/3}Co_{1/3}Mn_{1/3})O_2$, $Li(Ni_{0.5}Co_{0.2}Mn_{0.3})O_2$, $Li(Ni_{0.8}Co_{0.01}Mn_{0.1})O_2$, or the like.

The active material particle may include a negative electrode active material, for example. The active material particle may include, for example, at least one selected from the group consisting of graphite, soft carbon, hard carbon, silicon, silicon oxide, silicon-based alloy, tin, tin oxide, tin-based alloy, and $Li_4Ti_5O_{12}$.

<Binder>

The binder may be in powder form. The binder may bond a solid material to another solid material in the active material layer. The amount of the binder to be used may be, for example, from 0.1 to 10 parts by mass relative to 100 parts by mass of the active material. The binder may include an optional component. The binder may include, for example, at least one selected from the group consisting of polyvinylidene difluoride (PVdF), polytetrafluoroethylene (PTFE), vinylidene difluoride-hexafluoropropylene copolymer (PVdF-HFP), styrene-butadiene rubber (SBR), carboxymethylcellulose (CMC), polyimide (PI), polyamide-imide (PAI), and polyacrylic acid (PAA).

<Gas>

The gas is a dispersion medium for the aerosol. The gas may include an optional component. The gas may include, for example, at least one selected from the group consisting of air, nitrogen gas, and argon gas. For example, when the dispersoid (such as the active material and/or the solid electrolyte) in the aerosol is readily reacts with moisture in the air, an inert gas (such as nitrogen gas and/or argon gas) may be used.

<Optional Component>

The aerosol may further include a conductive material, for example. The conductive material may be in powder form. The conductive material may form an electron conduction path in the active material layer. The amount of the conductive material to be used may be from 0.1 to 10 parts by mass relative to 100 parts by mass of the active material. The conductive material may include an optional component. The conductive material may include a conductive carbon particle, a conductive carbon fiber, and/or the like, for example. The conductive material may include, for example, at least one selected from the group consisting of carbon black, vapor grown carbon fiber, carbon nanotube, and graphene flake. The carbon black may include, for example, at least one selected from the group consisting of acetylene black, furnace black, channel black, and thermal black.

The aerosol may further include a solvent, for example. The solvent is liquid. For example, the solvent may be in fume form. For example, the binder may absorb the solvent and be swollen. The solvent may include an optional component. The solvent may include, for example, at least one selected from the group consisting of water, N-methyl-2-pyrrolidone (NMP), and butyl butyrate.

The aerosol may further include a solid electrolyte, for example. That is, in the present production method, an electrode for an all-solid-state battery may also be produced. The solid electrolyte may be in powder form. The solid electrolyte may form an ion conduction path in the active material layer. The solid electrolyte may include an optional component. The solid electrolyte may include, for example, at least one selected from the group consisting of $Li_2S—P_2S_5$, $LiI—Li_2S—P_2S_5$, $LiBr—Li_2S—P_2S_5$, and $LiI—LiBr—Li_2S—P_2S_5$.

<Composite Particles>

The present production method may include forming composite particles, for example. Hereinafter, a collection of composite particles (powder) is also called "composite powder". For example, the aerosol may be made by mixing the composite powder with the gas.

The composite particle includes an active material particle and other solid materials. For example, when the active material particle and these other solid materials are mixed under conditions where a strong shearing force is being applied, the composite particle may be formed. In the composite particle, a binder and a conductive material may be fixed to the surface of the active material particle, for example.

In the present embodiment, as described below, solid particles (an electrode material) fly and thereby an active material layer is formed. When specific gravities of the materials vary, a lighter material may fly preferentially. This may result in a non-uniform composition of the active material layer. In the configuration in which the active material particle, the conductive material, and the binder form the composite particles, a uniform active material layer is expected to be formed.

After the composite particles are formed, the composite particles may be subjected to heat treatment at, for example, a temperature near the melting point of the binder. Due to this heat treatment, the binder is softened, melted, and re-solidified. As a result, the binder, the conductive material, and the like are expected to be firmly fixed to the surface of the active material particle. When the fixation is not firm, the conductive material and the like may be peeled off from the surface of the active material particle while the composite particles are flying, for example.

For example, when the composite particle includes a plurality of the active material particles (more specifically, when the composite particle is an aggregate of the active material particles), the flying ability of the composite particle may be decreased. It may be because the mass of the composite particle is increased. For example, the composite particle may include a single active material particle. That is, the binder, the conductive material, and the like may adhere to a single active material particle to form a single composite particle.

<<(b) Forming Film-Like Flow>>

The production method includes forming a film-like flow of the aerosol. In the present production method, the film-like flow of the aerosol can be formed by any method. In the film-like flow, the gas included in the aerosol may transfer a solid component (such as the active material) in the flow direction. For example, the flow velocity of the gas or the like may be adjusted such that the film-like flow does not become a turbulent flow but becomes a laminar flow.

Figure 2:
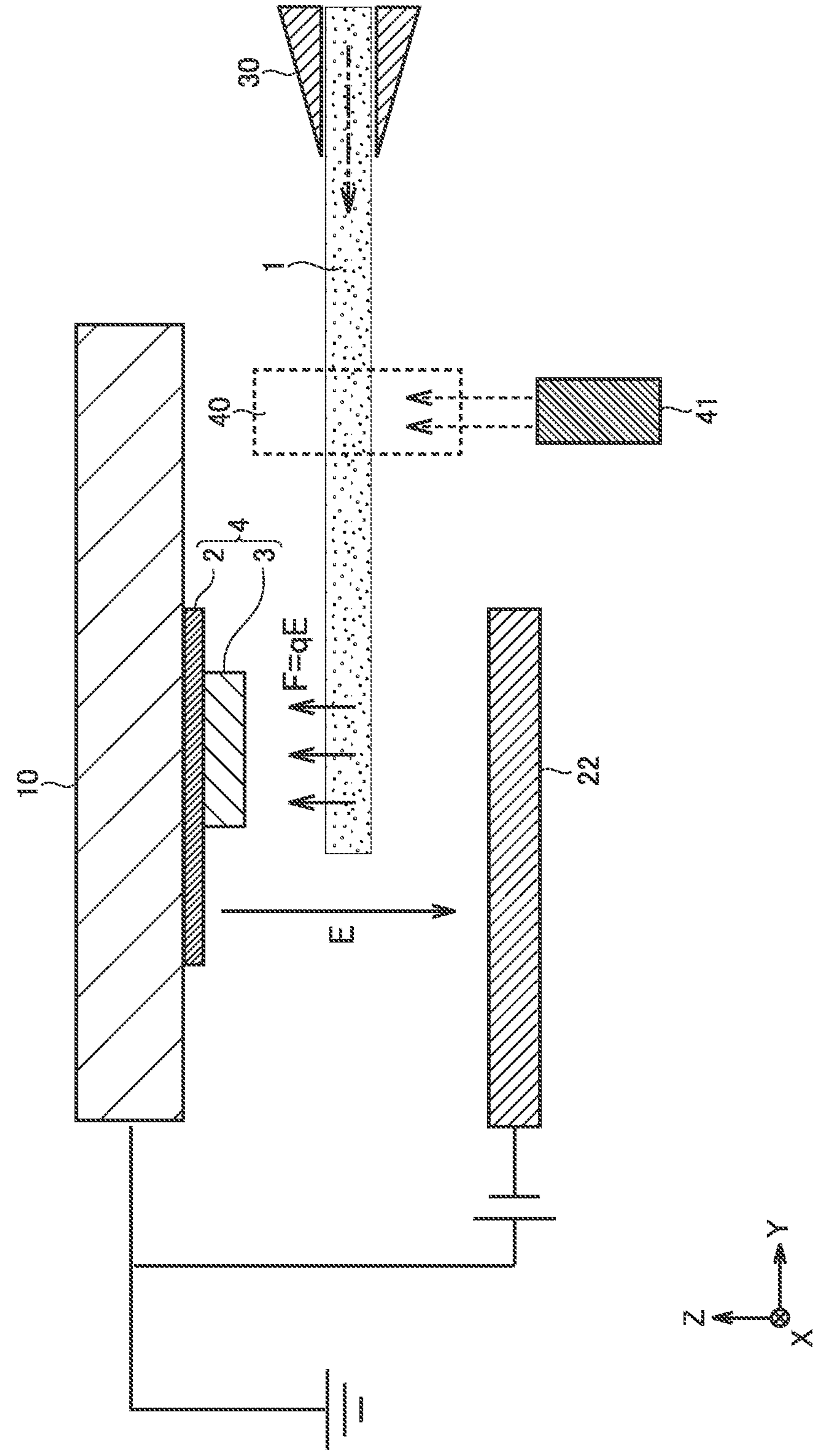
FIG. 2 is a first conceptual diagram showing a process of producing the electrode.

FIG. 2 is a first conceptual diagram showing a process of producing an electrode. For example, the aerosol may be ejected from a nozzle 30 in the form of a film, thereby forming a film-like flow 1. Film-like flow 1 has an external appearance in the form of a film. Film-like flow 1 has an expanse in the form of a plane. That is, film-like flow 1 is formed to have a flow direction, a width direction, and a thickness direction. The flow direction corresponds to a Y-axis direction in FIG. 2. The width direction corresponds to an X-axis direction in FIG. 2. The width direction is orthogonal to the flow direction. The thickness direction corresponds to a Z-axis direction in FIG. 2. The thickness direction is orthogonal to the flow direction and the width direction.

Figure 3:
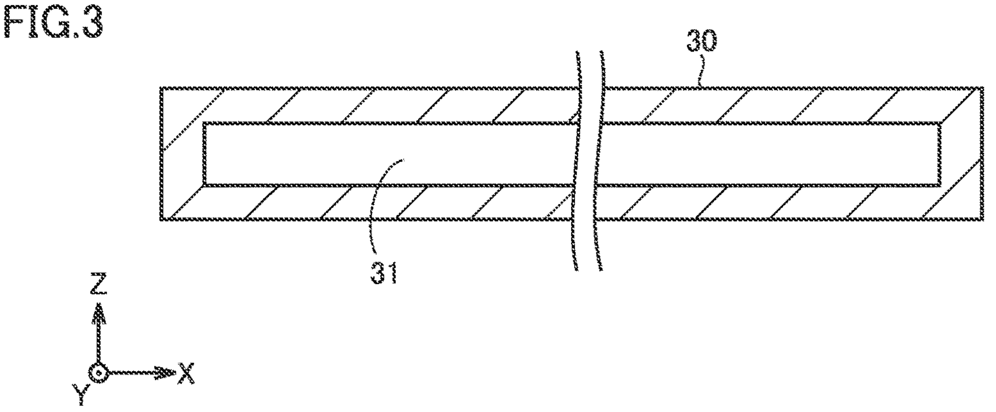
FIG. 3 is a conceptual diagram showing an ejection port of a nozzle.

FIG. 3 is a conceptual diagram showing an ejection port of the nozzle. The expanse (shape) of film-like flow 1 can be adjusted, for example, by the shape of ejection port 31 of nozzle 30. Nozzle 30 may be, for example, a flat nozzle. The flat nozzle may have ejection port 31 expanding in the width direction (X-axis direction). Ejection port 31 may extend in the form of a line in the width direction. Film-like flow 1 of the aerosol may be ejected from ejection port 31. Ejection port 31 may extend in the XZ plane in the form of a straight line, curved line, or wavy line.

Ejection port 31 may have, for example, a rectangular shape. The aspect ratio of ejection port 31 may be, for example, 5 to 100, 10 to 50, or 20 to 30. It should be noted that the "aspect ratio" indicates a ratio of the size in the width direction (X-axis direction) to the size in the thickness direction (Z-axis direction). The width of ejection port 31 can be adjusted in accordance with, for example, the width of a target active material layer.

<<(c) Forming Electrically-Charged Region>>

The present production method includes forming an electrically-charged region 40 by corona discharge. For example, electrically-charged region 40 may be formed to pass through film-like flow 1 in the width direction (X-axis direction). Thus, it is considered that variation in amount of charges in the width direction can be reduced.

For example, corona discharge occurs from a corona discharge electrode 41 (see FIG. 2). In FIG. 2, dotted arrows indicate an irradiation direction of the corona discharge. Electrically-charged region 40 can be formed in the irradiation direction of the corona discharge. Electrically-charged region 40 has an expanse in the thickness direction (Z-axis direction) of film-like flow 1. Electrically-charged region 40 may extend, for example, from corona discharge electrode 41 to a support part 10.

For example, electrically-charged region 40 may extend in the width direction. Electrically-charged region 40 extending in the width direction can be formed by any method. For example, a plurality of needle-shaped electrodes may be arranged side by side in the width direction. For example, a wire electrode (line-shaped electrode) extending in the width direction may be used.

Figure 4:
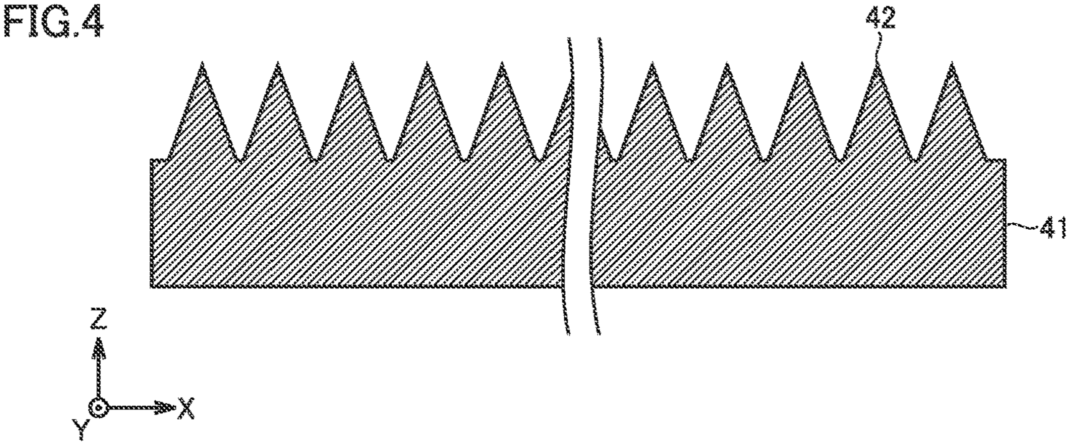
FIG. 4 is a conceptual diagram showing an exemplary corona discharge electrode.

FIG. 4 is a conceptual diagram showing an exemplary corona discharge electrode. Corona discharge electrode 41 may extend in the form of a line along the width direction (X-axis direction), for example. In a top view (XY plane), corona discharge electrode 41 may extend in the form of a straight line, curved line, or wavy line, for example. Since corona discharge electrode 41 extends in the width direction, electrically-charged region 40 also extends in the width direction. In the width direction, corona discharge electrode 41 may have a width larger than that of film-like flow 1. This is considered to facilitate formation of electrically-charged region 40 passing through film-like flow 1 in the width direction.

In the width direction, the width of corona discharge electrode 41 may be, for example, 1.01 to 2 times as large as the width of film-like flow 1, or 1.1 to 1.5 times as large as the width of film-like flow 1. The width of corona discharge electrode 41 in the width direction may be, for example, 1.01 to 2 times as large as the width of ejection port 31, or 1.1 to 1.5 times as large as the width of ejection port 31.

Corona discharge electrode 41 may include a plurality of protrusions 42. Each of protrusions 42 may protrude, for example, in the thickness direction (Z-axis direction) of film-like flow 1. Protrusion 42 may protrude toward support part 10, for example. Protrusion 42 may be tapered toward the tip thereof. The plurality of protrusions 42 are arranged side by side in the width direction. Corona discharge electrode 41 may include, for example, 2 to 100 protrusions 42. Corona discharge is likely to occur at the tip of each protrusion 42. By arranging the plurality of protrusions 42 side by side in the width direction, it is expected to attain a uniform charge density in electrically-charged region 40. Thus, it is expected to reduce variation in amount of charges. A space (pitch) between adjacent protrusions 42 may be, for example, 0.1 to 100 mm.

<<(d) Charging>>

The present production method includes allowing film-like flow 1 to pass through electrically-charged region 40. Electrically-charged region 40 is formed in a flight path of film-like flow 1. Since film-like flow 1 passes through electrically-charged region 40, charges are injected into the solid component included in film-like flow 1. That is, the solid component (active material or the like) is charged. In the present production method, electrically-charged region 40 may be formed to pass through film-like flow 1 in the width direction. Thus, it is considered that the solid component can be uniformly charged in the width direction. That is, it is considered that the variation in amount of charges in the width direction can be reduced.

The amount of charges of the solid component may be, for example, 100 nC/g or more, 500 nC/g or more, 1000 nC/g or more, or 1500 nC/g or more. As the amount of charges is larger, coating efficiency is expected to be improved. The amount of charges may be, for example, 3000 nC/g or less, or 2000 nC/g or less.

When film-like flow 1 passes through electrically-charged region 40, a gas may be blown in a direction in which film-like flow 1 is separated away from corona discharge electrode 41, for example. When the solid component of film-like flow 1 (aerosol) falls onto the corona discharge electrode 41 side, a material may be lost, with the result that the coating efficiency may be decreased. By blowing the gas to separate film-like flow 1 away from corona discharge electrode 41, it is expected to improve the coating efficiency. The blown gas may be air, for example. The gas may be blown in the same direction as the thickness direction (Z-axis direction) of film-like flow 1, for example.

<<(e) Electrostatic Coating>>

The present production method includes introducing film-like flow 1 into an electric field (E) after passing through electrically-charged region 40. In the electric field, electrostatic force ($F=qE$) in a direction toward a substrate 2 acts on film-like flow 1. With the electrostatic force, the solid component (the active material or the like) of film-like flow 1 is adhered onto a surface of substrate 2. Thus, an active material layer 3 is formed. That is, an electrode 4 is produced.

Substrate 2 may be in sheet form, for example. Substrate 2 may be a current collector. Substrate 2 may include a metal foil, for example. Substrate 2 may include, for example, at least one selected from the group consisting of aluminum (Al) foil, Al alloy foil, Cu foil, Cu alloy foil, nickel (Ni) foil, Ni alloy foil, titanium (Ti) foil, and Ti alloy foil. Substrate 2 may have a thickness from 5 to 50 μm, or may have a thickness from 5 to 20 μm, for example.

For example, substrate 2 is supported by support part 10. For example, DC voltage is applied between support part 10 and a counter electrode 22. Thus, an electric field is formed between support part 10 and counter electrode 22. The electric field is formed such that electrostatic force acts on film-like flow 1 in the direction toward substrate 2 (support part 10). The intensity of the electric field may be, for example, 50 to 500 V/mm. The intensity of the electric field is evaluated by dividing the DC voltage by a gap between support part 10 and counter electrode 22. The DC voltage may be, for example, 500 to 1500 V. The gap may be, for example, 1 to 10 mm.

<<(f) Fixing>>

The present production method may include applying at least one of pressure and heat to active material layer 3 to fix active material layer 3 to substrate 2. Fixing active material layer 3 is expected to enhance the peel strength of active material layer 3, for example.

Figure 5:
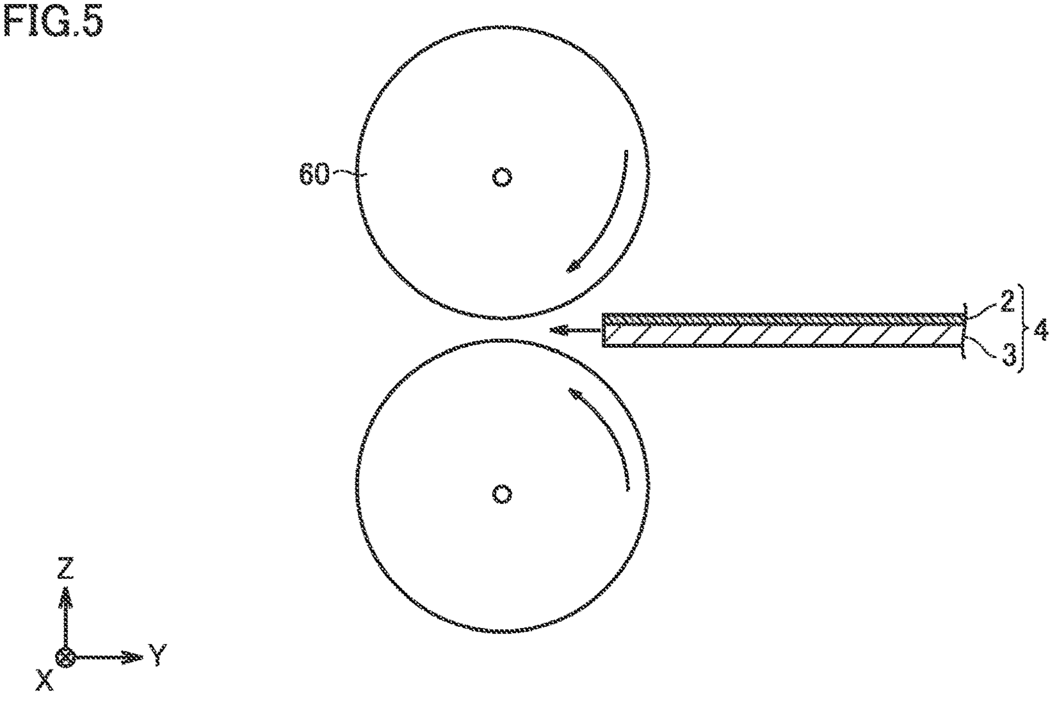
FIG. 5 is a second conceptual diagram showing the process of producing the electrode.

FIG. 5 is a second conceptual view showing a process of producing an electrode. The pressure and heat may be separately applied. The pressure and the heat may be applied substantially at the same time. For example, the active material layer may be compressed with a heated roll 60, a heated plate, and/or the like. The temperature for heating active material layer 3 may be a temperature near the melting point of the binder, for example. The heating temperature may be from 80 to 200° C., or may be from 120 to 200° C., or may be from 140 to 180° C., for example.

The pressure may be adjusted depending on the target thickness, target density, and/or the like of active material layer 3, for example. A pressure from 50 to 200 MPa may be applied to active material layer 3, for example.

Active material layer 3 may be formed only on one surface of substrate 2, or may be formed on each of both front and rear surfaces of substrate 2. Active material layer 3 (after fixing) may have a thickness of 10 m to 1 mm, or may have a thickness of 50 m to 500 m, for example. Active material layer 3 may have a density of 1 to 5 g/cm$^3$, or may have a density of 2 to 4 g/cm$^3$, for example.

<First Production Apparatus>

Figure 6:
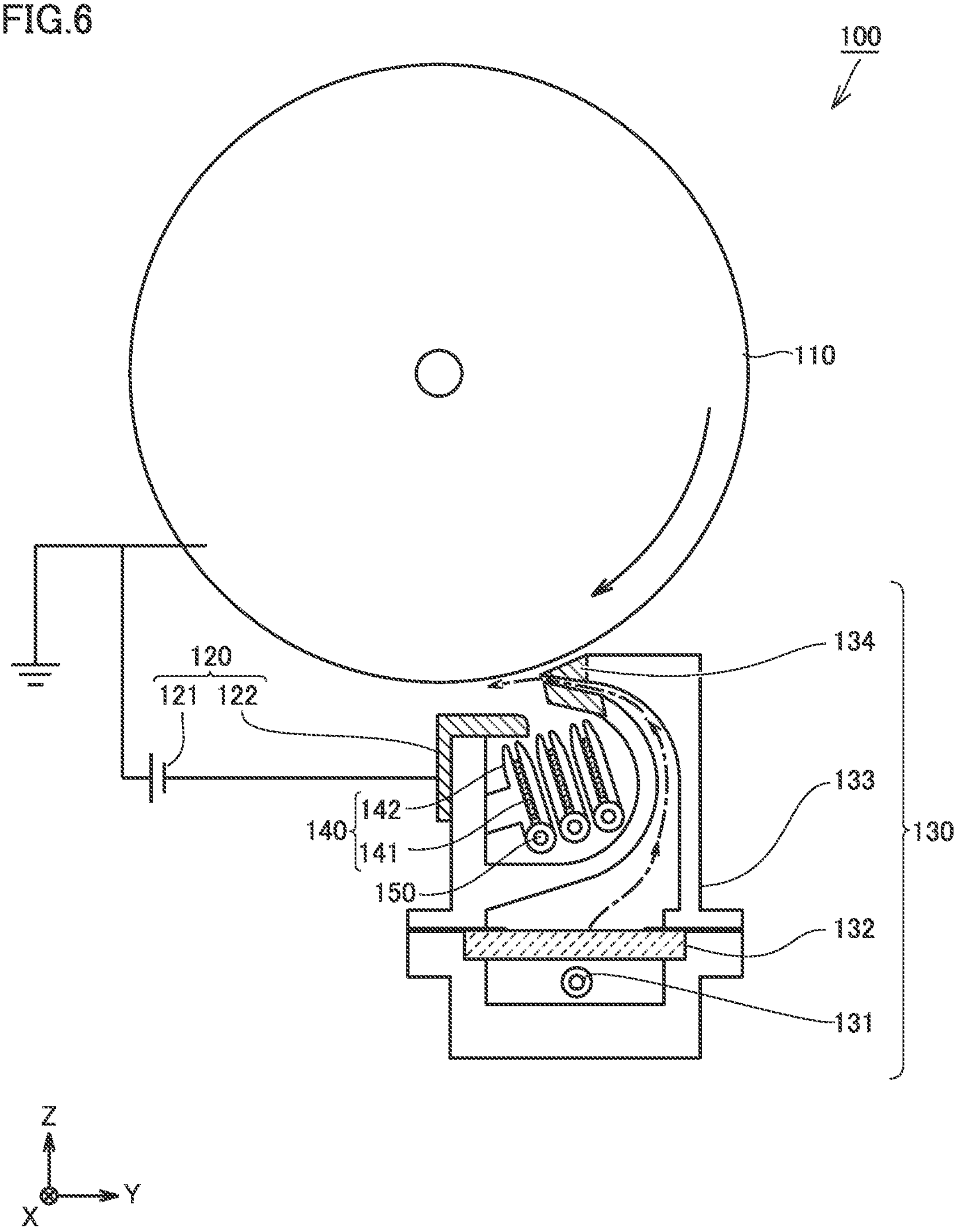
FIG. 6 is a schematic cross sectional view showing a first production apparatus.

FIG. 6 is a schematic cross sectional view showing a first production apparatus. In a first production apparatus 100, the present production method can be performed. First production apparatus 100 includes a support part 110, an electric-field-forming apparatus 120, an aerosol-supplying part 130, and a charging apparatus 140. First production apparatus 100 may further include, for example, a blower apparatus 150, a fixing apparatus (not shown), a controller (not shown), and the like. The controller may control operation and cooperation of each apparatus, for example. In first production apparatus 100, electrodes can be continuously produced. In each of FIGS. 6 to 8, each of arrows of alternate long and short dashed lines indicates the flow of each of the aerosol and the film-like flow.

<<Support Part>>

Support part 110 supports a substrate. Support part 110 is in a roll form. Support part 110 can also be referred to as "backup roll". The substrate, which is in a sheet form, is supported on a surface of support part 110. By rotation of support part 110, the substrate is transferred. The substrate may be in a strip form. Support part 110 may have a width (size in the X-axis direction) larger than that of the substrate. Support part 110 may have a width larger than that of the film-like flow.

Support part 110 may have electric conductivity. A whole of support part 110 may have electric conductivity. A portion of support part 110 may have electric conductivity. For example, a portion thereof in contact with the substrate may have electric conductivity. For example, a surface layer of support part 110 may have electric conductivity. Support part 110 is electrically connected to a high-voltage power supply 121. Support part 110 may be grounded.

<<Electric-Field-Forming Apparatus>>

Electric-field-forming apparatus 120 forms an electric field. Electric-field-forming apparatus 120 may include, for example, high-voltage power supply 121 and a counter electrode 122. High-voltage power supply 121 applies DC voltage between support part 110 and counter electrode 122. Thus, an electric field is formed between support part 110 and counter electrode 122. The electric field has a direction from support part 110 toward counter electrode 122. Electrostatic force acts on negative charges in the electric field in a direction toward substrate 2 (support part 110). Counter electrode 122 may have a width (size in the X-axis direction) larger than that of film-like flow 1.

<<Aerosol-Supplying Part>>

Aerosol-supplying part 130 forms the film-like flow of the aerosol. Details of the aerosol are as described above. Aerosol-supplying part 130 may include, for example, a gas-supplying part 131, a porous plate 132, an aerosol-making part 133, and a flat nozzle 134.

Porous plate 132 partitions between gas-supplying part 131 and aerosol-making part 133. The solid component (the active material or the like) of the aerosol can be placed on porous plate 132. Porous plate 132 has a plurality of open pores formed in it. For example, the sieve opening of porous plate 132 may be adjusted so that the active material powder are not buried in the open pores. The sieve opening of porous plate 132 may be 0.5 to 2 times greater than the D50 of the active material powder, for example. The sieve opening of porous plate 132 may be from 5 to 20 μm, for example. Porous plate 132 may be formed with any material. For example, porous plate 132 may be a sintered material made of ceramic powder. Porous plate 132 may be made of alumina, for example.

Gas-supplying part 131 supplies a gas to aerosol-making part 133 through porous plate 132. In aerosol-making part 133, the gas can be mixed with the solid component, thereby making the aerosol. Since the gas passes through porous plate 132, the flow of the gas in the in-plane direction is expected to become uniform. Thus, it is expected to stabilize the composition of the aerosol. Aerosol-making part 133 may include, for example, a stirring blade or the like. The stirring blade may mix the materials. For example, aerosol-making part 133 may be vibrated. The materials may be mixed by the vibration of aerosol-making part 133. For example, the materials may be mixed by using both the stirring by the stirring blade and the vibration.

At an early stage of the making of the aerosol, the solid component (the active material or the like) in a stationary state is exposed to the gas flow on porous plate 132. On this occasion, the solid component may be brought upward vigorously to leak from flat nozzle 134. That is, part of the materials may be lost. For example, the internal volume (for example, the size in the Z-axis direction) of aerosol-making part 133 may be adjusted to avoid the leakage of the materials.

Details of flat nozzle 134 are as described above. Flat nozzle 134 has an ejection port having a flat shape. The ejection port extends in the width direction (X-axis direction). Flat nozzle 134 can convert the flow of the aerosol into the film-like flow. Flat nozzle 134 may eject the film-like flow in a tangential direction of support part 110. That is, in a cross section orthogonal to the rotation axis of support part 110, the flow direction of the film-like flow may be along the tangential direction of support part 110. Since the film-like flow flies along the tangential direction of the roll, the flow direction and the width direction of the film-like flow are along the surface of the substrate. Since the film-like flow is along the surface of the substrate, the active material layer is expected to be formed smoothly.

In a cross section (YZ plane) orthogonal to the width direction of the film-like flow, the flow path in flat nozzle 134 may be tapered toward the tip thereof. With the tapered flow path, it is expected to facilitate the film-like flow to become a laminar flow, for example.

<<Charging Apparatus>>

Charging apparatus 140 forms the electrically-charged region by corona discharge. Charging apparatus 140 may include, for example, a corona discharge electrode 141. Charging apparatus 140 may further include, for example, a housing 142. Corona discharge electrode 141 may be accommodated in housing 142. Details of corona discharge electrode 141 are as described above. Corona discharge electrode 141 may extend in the form of a line along the width direction (X-axis direction). Corona discharge electrode 141 may include, for example, protrusions (see FIG. 4). Charging apparatus 140 may include a plurality of corona discharge electrodes 141. The plurality of corona discharge electrodes 141 may be arranged side by side in the flow direction of the film-like flow, for example. In first production apparatus 100, three rows of corona discharge electrodes 141 are disposed. For example, 1 to 10 rows of corona discharge electrodes 141 may be disposed.

The electrically-charged region can be formed by corona discharge that occurs from each corona discharge electrode 141. A discharge voltage may be, for example, −100 to −1 kV. The film-like flow passes through the electrically-charged region and is introduced into the electric field (the gap between support part 110 and counter electrode 122). The solid component of the film-like flow is charged when passing through the electrically-charged region. By the electrostatic force in the electric field, the solid component of the film-like flow is attracted to the substrate (support part 110). The solid component is adhered to the surface of the substrate, thereby forming the active material layer.

<<Blower Apparatus>>

First production apparatus 100 may further include blower apparatus 150. Blower apparatus 150 may be provided adjacent to corona discharge electrode 141. Blower apparatus 150 blows a gas in the direction toward support part 110. That is, blower apparatus 150 blows the gas in the direction in which the film-like flow is separated away from corona discharge electrode 141.

<<Fixing Apparatus>>

First production apparatus 100 may further include the fixing apparatus. The fixing apparatus applies at least one of heat and pressure to the active material layer to fix the active material layer to the substrate. The fixing apparatus may include, for example, heated roll 60, the heated press, or the like (see FIG. 5).

<Second Production Apparatus>

Figure 7:
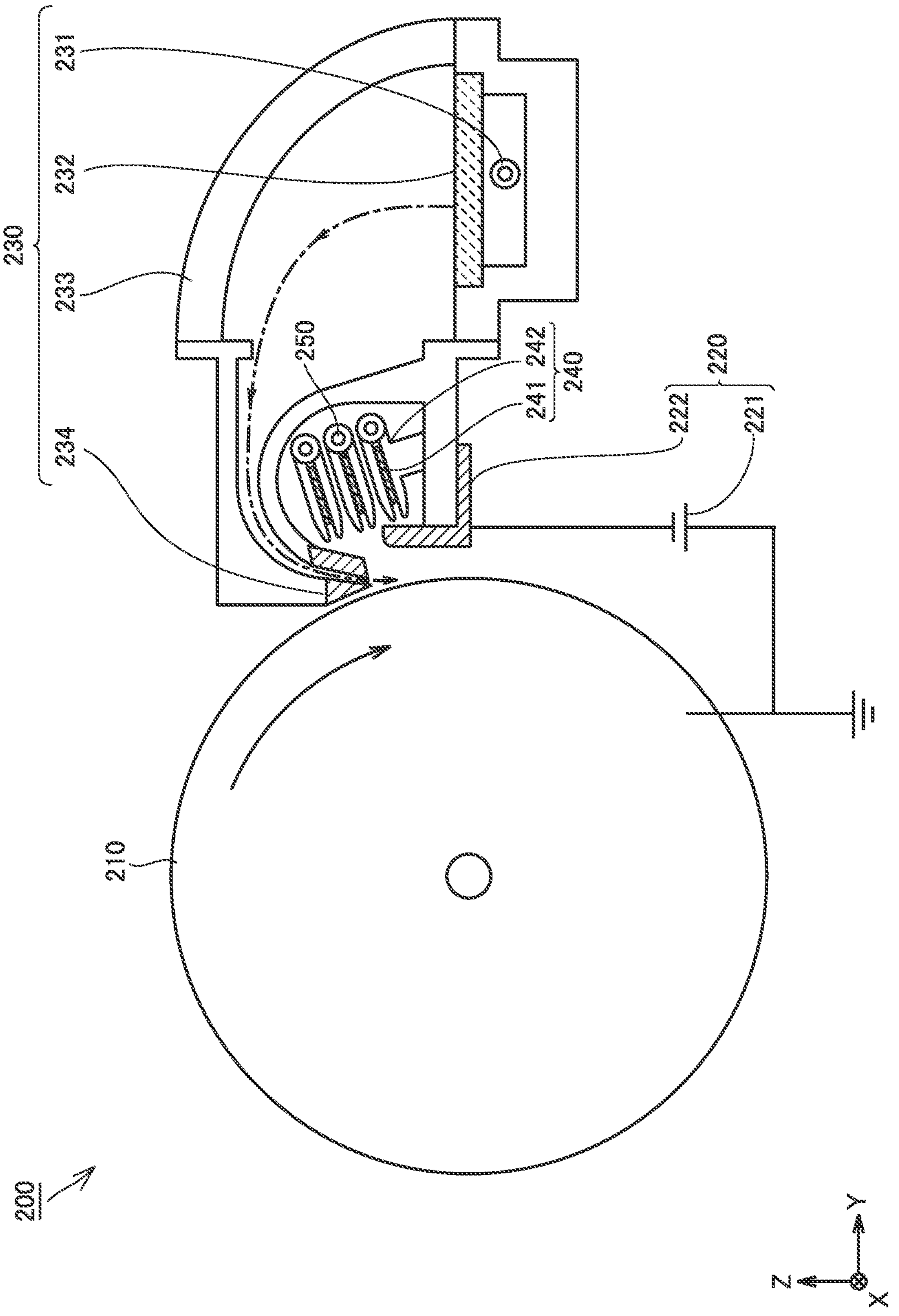
FIG. 7 is a schematic cross sectional view showing a second production apparatus.

FIG. 7 is a schematic cross sectional view showing a second production apparatus. Also in a second production apparatus 200, the present production method can be performed. Second production apparatus 200 includes a support part 210, an electric-field-forming apparatus 220, an aerosol-supplying part 230, and a charging apparatus 240. Second production apparatus 200 may further include a blower apparatus 250. Electric-field-forming apparatus 220 may include a high-voltage power supply 221 and a counter electrode 222. Aerosol-supplying part 230 may include a gas-supplying part 231, a porous plate 232, an aerosol-making part 233, and a flat nozzle 234. Charging apparatus 240 may include a corona discharge electrode 241 and a housing 242. Apparatuses and members having the same names may have the same functions between first production apparatus 100 and second production apparatus 200.

Second production apparatus 200 is different from first production apparatus 100 in that the flow direction of the film-like flow ejected from flat nozzle 234 is oriented vertically downward. In second production apparatus 200, the film-like flow and corona discharge electrode 241 are arranged side by side in the horizontal direction. Since corona discharge electrode 241 is not disposed vertically below the film-like flow, it is considered to reduce such a disadvantage that the solid component falls onto corona discharge electrode 241 due to gravity.

REFERENCE EMBODIMENT

Figure 8:
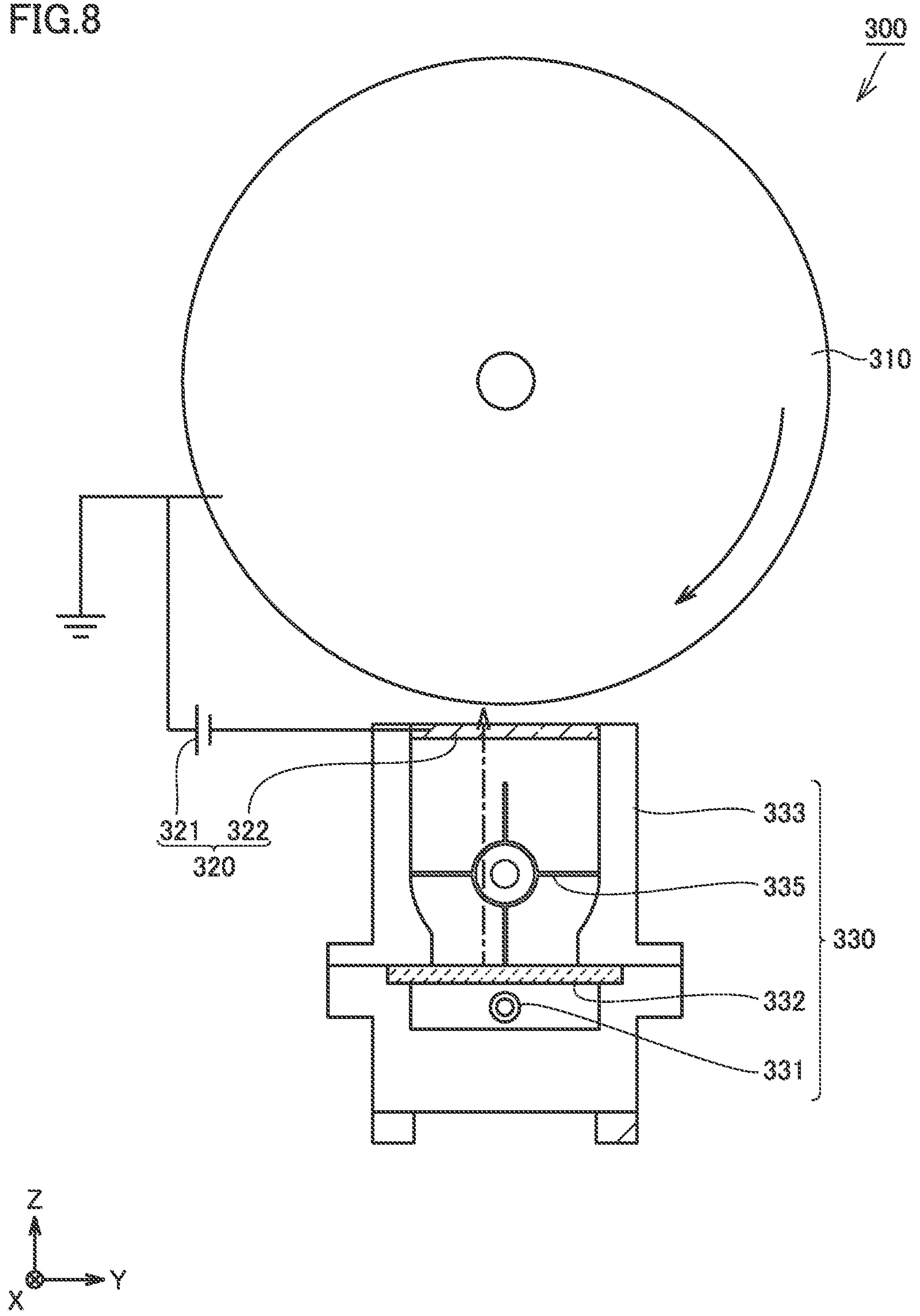
FIG. 8 is a schematic cross sectional view showing a third production apparatus.

FIG. 8 is a schematic cross sectional view showing a third production apparatus. A third production apparatus 300 is a production apparatus according to a reference embodiment. Third production apparatus 300 is different from first production apparatus 100 and second production apparatus 200 in terms of a charging method. Third production apparatus 300 includes a support part 310, an electric-field-forming apparatus 320, and an aerosol-supplying part 330. Electric-field-forming apparatus 320 includes a high-voltage power supply 321 and an electrostatic screen 322. Aerosol-supplying part 330 includes a gas-supplying part 331, a porous plate 332, an aerosol-making part 333, and a stirring blade 335.

High-voltage power supply 321 forms an electric field between support part 310 and electrostatic screen 322. High-voltage power supply 321 supplies charges to electrostatic screen 322. Electrostatic screen 322 is in a mesh form. In third production apparatus 300, when the aerosol passes through electrostatic screen 322, the solid component (particles) of the aerosol comes into contact with electrostatic screen 322, thereby charging the solid component. However, some particles may pass through electrostatic screen 322 without coming into contact with electrostatic screen 322. Therefore, third production apparatus 300 may be disadvantageous in terms of an amount of charges as compared with first production apparatus 100 and second production apparatus 200.

EXAMPLES

<Production of Electrode>

First Production Example

In a first production example, a positive electrode was produced by the present production method.

The Below Materials were Prepared.

Active material: $Li(NiCoMn)O_2$ (powder form)

Conductive material: acetylene black

Binder: PVdF

Substrate: Al foil (thickness, 12 μm)

A mixing apparatus “Multi-purpose Mixer” produced by Nippon Coke & Engineering Co., Ltd. was prepared. This apparatus includes a round tank (a mixing tank). The convection-promoting effect of the round tank generates a strong shearing force, which is capable of combining the solid materials together.

The active material, the conductive material, and the binder were introduced into the round tank. The blending ratio of the materials was “(active material powder)/(conductive material)/binder=90/5/5 (mass ratio)”. The number of revolutions of the stirring blade was set at 10000 rpm. The materials were mixed for 10 minutes. Thus, composite powder was formed. The composite powder is a collection of composite particles. It seems that each composite particle includes a single active material particle. It seems that the binder and the conductive material are fixed to the surface of the active material particle.

A metal tray was prepared. On the tray, the composite powder was thinly spread. The tray was stored in an oven for heat treatment to be performed on the composite powder. The temperature of the oven was set at 160° C. The duration of the storage was 30 minutes. It seems that the heat treatment caused the binder and the conductive material to be fixed to the surface of the active material particle.

First production apparatus 100 was prepared (see FIG. 6). A setting for each part is as follows.

Porous plate 132: alumina porous plate (sieve opening, 10 m; planar size, 75 mm×75 mm)

Corona discharge electrode 141: −20 kV

Amount of gas from blower apparatus 150: 3 L/min

Gap between corona discharge electrode 141 and support part 110: 16 mm

Counter electrode 122: −1000 V

Support part 110: 0 V (GND)

Gap between support part 110 and counter electrode 122: 4 mm

Electric field intensity: 250 V/mm

Transfer rate of substrate 2: 1 m/min

Composite powder was supplied onto porous plate 132. Vibration was applied to aerosol-making part 133. The frequency of the vibration was 120 Hz, and the amplitude of the vibration was 0.13 mm. In a state in which aerosol-making part 133 was vibrated, gas-supplying part 131 supplied air to aerosol-making part 133 through porous plate 132. An amount of the supplied air was 25 L/min. In this way, aerosol was made. The aerosol was ejected from flat nozzle 134, thereby forming a film-like flow. An electrically-charged region was formed by corona discharge electrode 141. The film-like flow passed through the electrically-charged region, thereby charging the film-like flow. The charged film-like flow was introduced into the electric field. An active material layer was formed at a rate of 1 m/min. That is, an electrode was produced. The active material layer had a planar size of 60 mm×200 mm.

The electrode was sandwiched between two heated plates (flat plates). The temperature of the heated plates was 160° C. By these heated plates, a load of 15 tf was applied to the active material layer. By this, the active material layer is supposed to be fixed to the substrate.

Second Production Example

In a second production example, a negative electrode was produced by the present production method.

The Below Materials were Prepared.

Active material: amorphous coat graphite (powder form)

Binder: PVdF

Substrate: Cu foil (thickness, 8 μm)

With regard to the amorphous coat graphite, the surface of each graphite particle is coated with an amorphous carbon material. A mixing apparatus “High Speed Mixer” produced by Earthtechnica Co., Ltd. was prepared. This apparatus is capable of generating a relatively gentle shearing force during mixing. Into the mixing tank of the mixing apparatus, the active material and the binder were added. The blending ratio of the materials was “active material/binder=97.5/2.5 (mass ratio)”. The number of revolutions of the stirring blade was set at 4500 rpm. The materials were mixed for 2 minutes. Thus, composite powder was formed. Except these, the same procedure as in the first production example was carried out to produce an electrode.

Third Production Example

In a third production example, a positive electrode was produced by the production method according to the reference embodiment. Composite powder was prepared in the same manner as in the first production example.

Third production apparatus 300 was prepared (see FIG. 8). A setting for each part was as follows.

Electrostatic screen 322: mesh composed of SUS (sieve opening, 100 μm)

Porous plate 332: alumina porous plate (sieve opening, 10 m; planar size, 75 mm×75 mm)

Gap between electrostatic screen 322 and support part 310: 4 mm

Electrostatic screen 322: −1000 V

Support part 310: 0 V (GND)

Electric field intensity: 250 V/mm

Onto porous plate 332, the composite powder was supplied. By gas-supplying part 331, air was supplied to the composite powder. An amount of the supplied air was 25 L/min. The composite powder and the air were stirred by stirring blade 335, and thereby an aerosol was formed. The number of revolutions of stirring blade 335 was 120 rpm.

The aerosol was supplied to the electric field through electrostatic screen 322, and thereby the active material layer was formed on the surface of the substrate. Except these, the same procedure as in the first production example was carried out to produce an electrode.

Fourth Production Example

An electrode (negative electrode) was produced in the same manner as in the third production example except that the composite powder of the second production example was used.

<Evaluation Method>

<<Quality of Active Material Layer>>

The quality (presence/absence of deficiencies or the like) of the active material layer was visually checked.

<<Amount of Charges>>

The aerosol after the charging was collected. An amount of charges was measured by a suction-type Faraday cage (produced by Nano Seeds Corporation). In accordance with the mass of the solid component of the aerosol and the amount of charges, an amount of charges per unit mass [nC/g] was found.

<<Coating Weight of Active Material Layer>>

With a punch, a specimen was sampled from the electrode. The specimen had a circular shape. The diameter of the specimen was 25 mm. By measuring the mass of the specimen, a coating weight of the active material layer was found. The coating weight represents a mass per unit area [$mg/cm^2$].

TABLE 1

| | Production Method | | Evaluation Results | | |
|---|---|---|---|---|---|
| | | | Aerosol (Solid Component) | Active Material Layer | |
| | Electrode | Production Apparatus | Amount of Charges [nC/g] | Quality | Coating Weight [$mg/cm^2$] |
| First Production Example | Positive Electrode | FIG. 6 | −1683 | Excellent | 24.8 |
| Second Production Example | Negative Electrode | FIG. 6 | −1898 | Excellent | 30.3 |
| Third Production Example | Positive Electrode | FIG. 8 | −64 | Excellent | 5.6 |
| Fourth Production Example | Negative Electrode | FIG. 8 | −71 | Excellent | 6.1 |

<Evaluation Results>

In each of the production examples, no deficiencies or the like were observed in the active material layer. That is, the quality of the active material layer was excellent.

In each of the third and fourth production examples, the amount of charges was smaller than that in each of the first and second production examples. It is considered that part of the solid component (particles) of the aerosol pass through the electrostatic screen without coming into contact with the electrostatic screen.

In each of the first and second production examples, the amount of charges was significantly larger than that in each of the third and fourth production examples. It is considered that the solid component is uniformly charged in the width direction of the aerosol (film-like flow). In each of the first and second production examples, the coating weight was also increased. It is considered that the coating efficiency is improved in response to the increased amount of charges.

The present embodiment and the present example are illustrative in any respect. The present embodiment and the present example are non-restrictive. The technical scope of the present disclosure encompasses any modifications within the meaning and the scope equivalent to the terms of the claims. For example, it is expected that certain configurations of the present embodiments and the present examples can be optionally combined.

What is claimed is:

1. A method of producing an electrode for a lithium-ion battery, the method comprising:

(a) making an aerosol including an active material, a binder and a gas;

(b) forming a film flow of the aerosol;

(c) forming an electrically-charged region by corona discharge;

(d) allowing the film flow to pass through the electrically-charged region;

(e) introducing the film flow into an electric field after passing through the electrically-charged region, and (f) applying at least one of heat and pressure to the active material layer to fix the active material layer to a substrate;

wherein, in the electric field, an active material layer is formed by adhering a solid component of the film flow onto a surface of the substrate by electrostatic force;

the film flow has a flow direction and a width direction;

the width direction is orthogonal to the flow direction;

the corona discharge occurs from a corona discharge electrode;

the corona discharge electrode extends in a form of a line along the width direction; and in the width direction, the corona discharge electrode has a width larger than a width of the film flow;

wherein each of the flow direction and the width direction is orthogonal to a vertical direction, the corona discharge electrode is disposed vertically below the film flow, and the substrate is disposed vertically above the film flow.

2. The method of producing the electrode for a lithium-ion battery according to claim 1, wherein the corona discharge electrode includes a plurality of protrusions, and the plurality of protrusions are arranged side by side in the width direction.

3. The method of producing the electrode for a lithium-ion battery according to claim 1, wherein in the (d), a gas is blown toward the film flow in a direction in which the film flow is separated away from the corona discharge electrode.

4. The method of producing the electrode for a lithium-ion battery according to claim 1, wherein the substrate is in a sheet form, and the flow direction and the width direction of the film flow are along the surface of the substrate.

5. The method of producing the electrode for a lithium-ion battery according to claim 1, wherein the lithium-ion battery is an all-solid-state battery.

* * * * *